(12) United States Patent
Devane et al.

(10) Patent No.: US 8,839,193 B1
(45) Date of Patent: Sep. 16, 2014

(54) CONTROL SURFACES FOR A TECHNICAL COMPUTING ENVIRONMENT

(75) Inventors: Charles J. Devane, Upton, MA (US); Darel Allen Linebarger, Southborough, MA (US); Donald Paul Orofino, Sudbury, MA (US)

(73) Assignee: The Mathworks, Inc., Natick, MA (US)

( * ) Notice: Subject to any disclaimer, the term of this patent is extended or adjusted under 35 U.S.C. 154(b) by 190 days.

(21) Appl. No.: 13/356,912

(22) Filed: Jan. 24, 2012

Related U.S. Application Data

(60) Provisional application No. 61/493,664, filed on Jun. 6, 2011.

(51) Int. Cl.
*G06F 9/44* (2006.01)

(52) U.S. Cl.
USPC ............ 717/111; 717/104; 717/106; 717/121

(58) Field of Classification Search
None
See application file for complete search history.

(56) References Cited

U.S. PATENT DOCUMENTS

2011/0225578 A1* 9/2011 Lauwers et al. .............. 717/176

OTHER PUBLICATIONS

"Introduction to OSC", http://opensoundcontrol.org/book/exort/html/, printed Jan. 24, 2012, 1 page.
Goga, Larry, "The MIDI Throughput.vi and the mididII.dII", National Instruments, May 22, 2008, pp. 1-3.
"An Introduction to MIDI", MIDI Manufacturers Association, 2009, pp. 1-16.

\* cited by examiner

*Primary Examiner* — Chuck Kendall
(74) *Attorney, Agent, or Firm* — Harrity & Harrity, LLP

(57) ABSTRACT

A technical computing environment may include a modeling component to facilitate construction of a model and a code generation component. The modeling component may include an input component to receive one or more input signals through an interface protocol, and one or more components to receive one or more parameters, corresponding to the input signals received using the interface protocol, and to operate on the one or more parameters. The code generation component may include a code generator to generate, from the model, programming code compatible with a target environment, and an output interface to output the programming code.

41 Claims, 8 Drawing Sheets

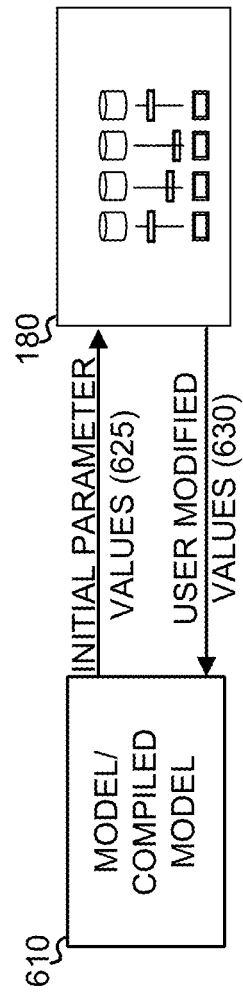
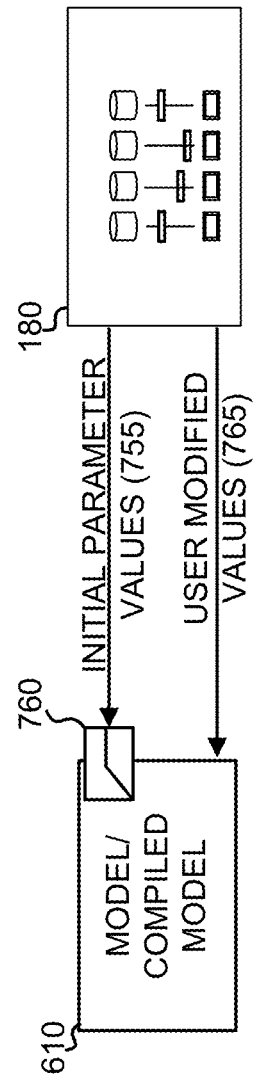

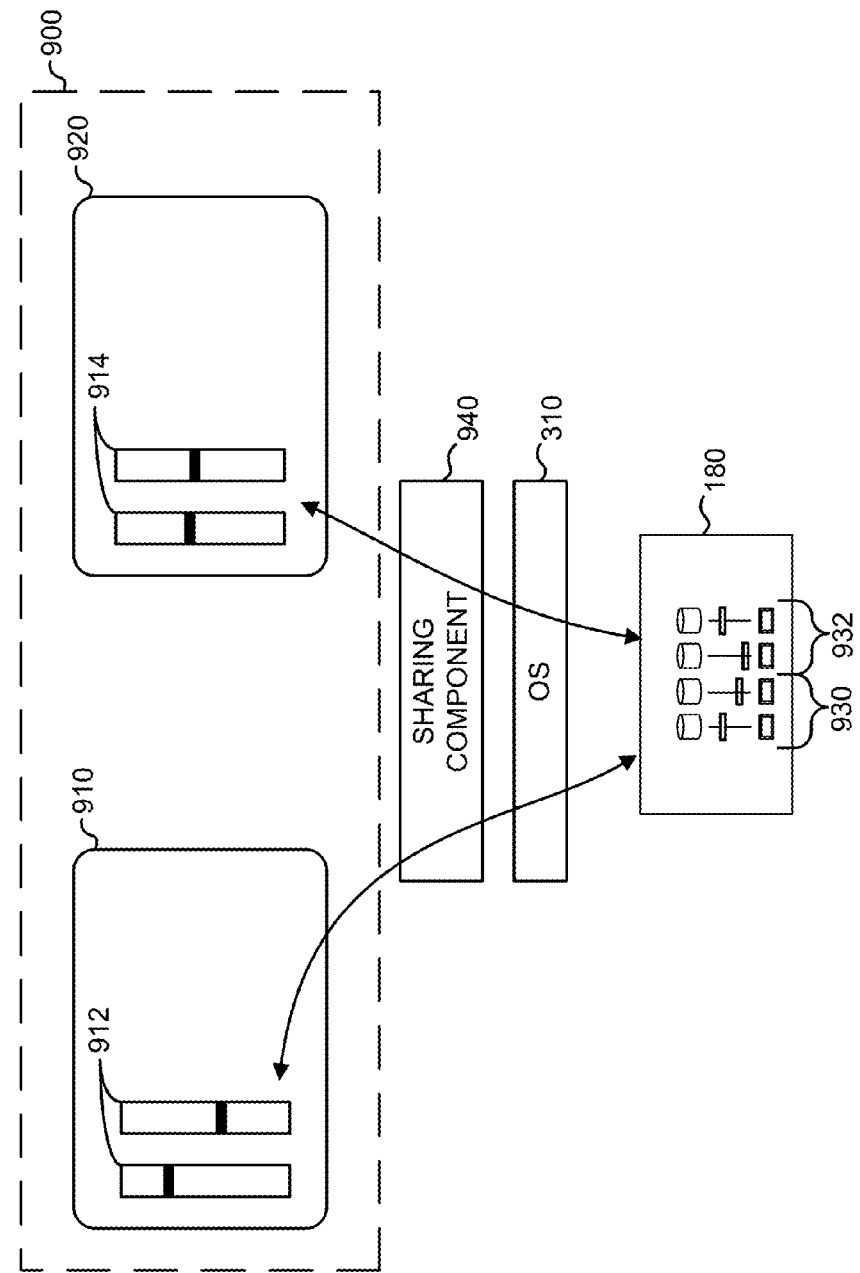

US 8,839,193 B1

CONTROL SURFACES FOR A TECHNICAL COMPUTING ENVIRONMENT

RELATED APPLICATIONS

This application claims priority to U.S. Provisional Patent Application No. 61/493,664, filed Jun. 6, 2011, the disclosure of which is incorporated by reference herein.

BACKGROUND

Technical computing environments (TCEs) are known that present a user, such as a scientist or engineer, with an environment that enables efficient analysis and generation of technical applications. For example, users may perform analyses, visualize data, and develop algorithms. Technical computing environments may allow a technical researcher or designer to efficiently and quickly perform tasks, such as research and product development.

Existing technical computing environments may be implemented as, or executed in conjunction with, a graphically-based modeling environment. For example, in one existing graphically-based modeling environment, graphical simulation tools allow models to be built by connecting graphical blocks, where each block may represent an object associated with functionality and/or data. The technical computing environment and the graphically-based modeling environment may be a single, integrated application.

Some models created with TCEs may execute interactively with respect to input received from a user. For example, a model may present a graphical interface to a user, who may adjust, as the model executes, a number of parameters of the model.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a diagram illustrating an example of bi-directional communications between a model or a compiled model and a control surface;

FIG. 7 is a diagram illustrating an example of unidirectional communications between a model/compiled model and a control surface;

FIG. 9 is a diagram illustrating example graphical interfaces presented by a model.

DETAILED DESCRIPTION

Figure 1:
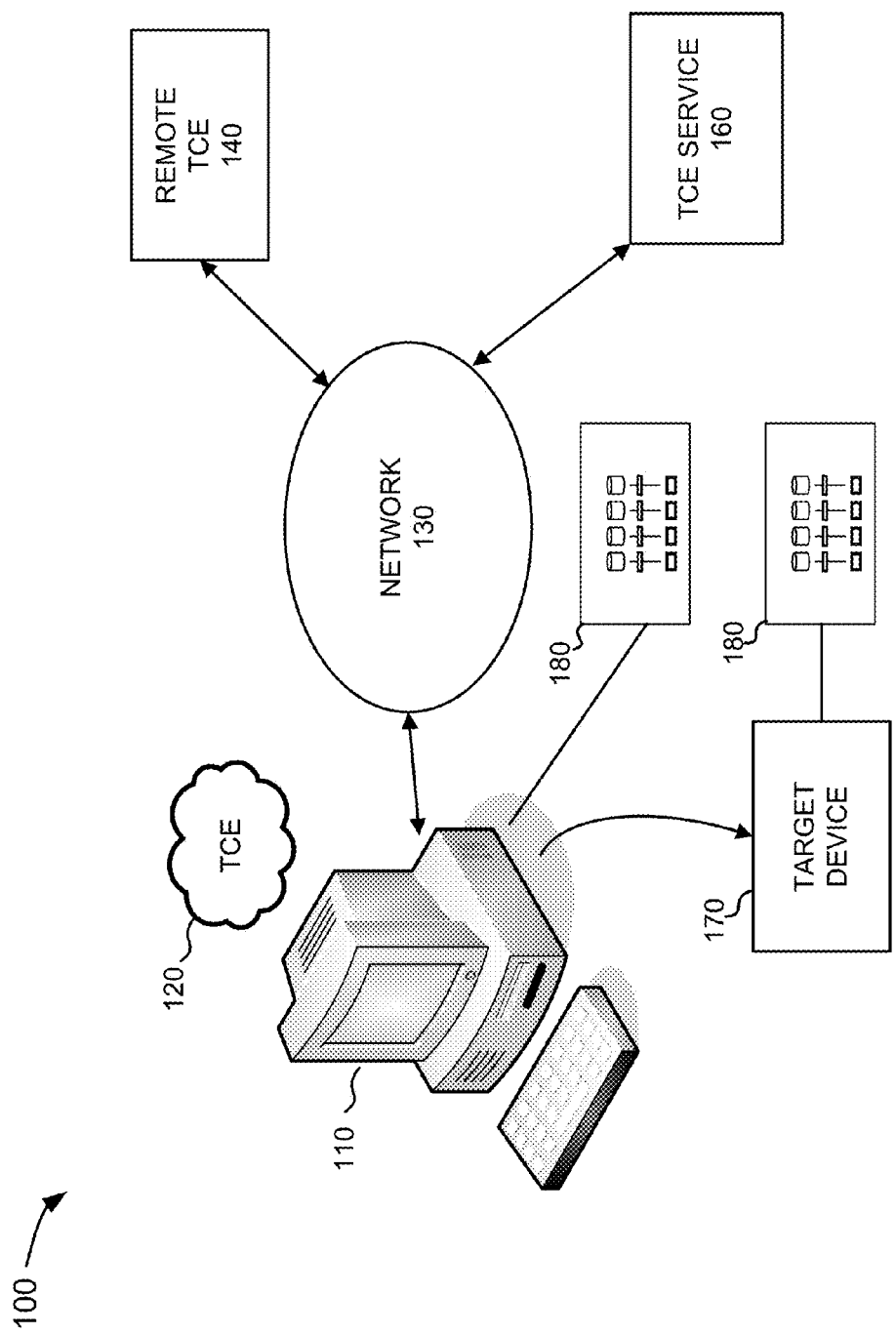
FIG. 1 is diagram of an example system in which concepts described herein may be implemented.

The following detailed description refers to the accompanying drawings. The same reference numbers in different drawings may identify the same or similar elements.

Implementations described herein may relate to human interface devices that may be used to provide input signals to a model, generated in a TCE, such as a model executing on a general-purpose computing device or a model exported to a target device. The human interface devices may include general-purpose input devices, such as Musical Instrument Digital Interface (MIDI) devices. The model may include a MIDI interface component to receive signals from the MIDI devices using the MIDI protocol or a subset of the MIDI protocol. In one implementation, the human interface devices may be hot-pluggable and/or removable, potentially allowing a user to plug a human interface device into a running model and adjust parameters of the model without otherwise interrupting operation of the model.

A MIDI device may include one or more physical controls, such as buttons, knobs, sliders, touch pad, etc. Physical controls may provide a more intuitive and useable input mechanism relative to a virtual control implemented as part of a graphical interface. The MIDI interface component may provide a straightforward (e.g., intuitive) mechanism, from the perspective of the user, for using the MIDI device to input parameter values to a model. A user can incorporate available, off-the-shelf MIDI devices, in designs created with the TCE.

Definitions

A Technical Computing Environment (TCE) may include any hardware and/or software based logic that provides a computing environment that allows users to perform tasks related to disciplines, such as, but not limited to, mathematics, science, engineering, medicine, and business. The TCE may include text-based facilities (e.g., MATLAB® software), a graphically-based environment (e.g., Simulink® software, Stateflow® software, SimEvents™ software, etc., by The MathWorks, Inc.; VisSim by Visual Solutions; LabView® by National Instruments; etc.), or another type of environment, such as a hybrid environment that includes one or more of the above-referenced text-based environments and one or more of the above-referenced graphically-based environments.

The TCE may be integrated with or operate in conjunction with a graphical modeling environment, which may provide graphical tools for constructing models, systems, or processes. The TCE may include additional tools, such as tools designed to convert a model into an alternate representation, such as source computer code, compiled computer code, or a hardware description (e.g., a description of a circuit layout). In one implementation, the TCE may provide this ability using toolboxes (e.g., toolboxes for signal processing, image processing, color manipulation, data plotting, parallel processing, etc.). The toolboxes may provide a graphical or textual interface for the users. In another implementation, the TCE may provide these functions as block sets. In still another implementation, the TCE may provide these functions in another way.

Models generated with the TCE may be, for example, models of a physical system, a computing system (e.g., a distributed computing system), an engineered system, an embedded system, a biological system, a chemical system, etc.

System Description

FIG. 1 is diagram of an example system 100 in which concepts described herein may be implemented. System 100 may include a personal computer or workstation 110. Workstation 110 may execute a TCE 120 that presents a user with an interface that enables design, analysis, and generation of, for example, technical applications, engineered systems, and business applications. For example, TCE 120 may provide a numerical and/or symbolic computing environment that allows for matrix manipulation, plotting of functions and data, implementation of algorithms, creation of user interfaces, and/or interfacing with programs in other languages. TCE 120 may particularly include a graphical and/or textual modeling component and a component to convert graphic models into other forms, such as computer source code (e.g., C++ code) or hardware descriptions (e.g., a description of an electronic circuit). In one implementation, the graphical modeling capability of TCE 120 may also include state-based, time-based, event-based, and/or dataflow-based software to facilitate construction of graphical models based on state, time, event, and/or dataflow diagrams and/or charts. For example, Stateflow software may generally allow a user to describe complex logic in a natural form using state charts or flow diagrams.

Workstation 110 may operate as a single detached computing device. Alternatively, workstation 110 may be connected to a network 130, such as a local area network (LAN) or a wide area network (WAN), such as the Internet. When workstation 110 is connected to a network, TCE 120 may be executed by multiple networked computing devices or by one or more remote computing devices. In such an implementation, TCE 120 may be executed in a distributed manner, such as by executing on multiple computing devices simultaneously. Additionally, in some implementations, TCE 120 may be executed over network 130 in a client-server relationship. For example, workstation 110 may act as a client that communicates with, using a web browser, a server that stores and potentially executes substantive elements of TCE 120.

As shown in FIG. 1, system 100 may include a remote TCE 140 (e.g., a remotely located computing device running a TCE) and/or a TCE service 160. TCE service 160 may include a server computing device that provides a TCE as a remote service. For instance, a TCE may be provided as a web service, a service provided over a computing cloud, etc. For example, a web service may provide access to one or more programs provided by TCE service 160.

In one implementation, models created with TCE 120 may be executed at workstation 110 to present an interface, such as a graphical interface, to a user. In some implementations, TCE 120 may generate, based on the model, code that is executable on another device. As shown in FIG. 1, a target device 170 may include, for example, a consumer electronic device, a factory control device, an embedded device, a general computing device, a graphics processing unit or device, a field programmable gate array (FPGA), an application specific integrated circuit (ASIC), or any other type of programmable device.

Users may interact, through a human interface devices, with models created with TCE 120. One human interface devices which can be used to interact with models executing in workstation 110 or target device 170 may include a MIDI compatible device referred to as a "MIDI control surface" or "control surface" herein. Example control surfaces 180 are illustrated in system 100. Control surface 180 may include a physical device with generic, programmable controls, such as knobs, sliders, buttons, etc., that can be used to control a model implemented by TCE 120 and/or a target device 170. Alternatively or additionally, instead of physically actuating a control, control surface 180 may include virtual physical controls, such as a knob or slider that is associated with a ring or line of visual indicators (e.g., LEDs) that are turned on/off to indicate the position of the know or slider. As another example of a control surface 180, control surface 180 may be a virtual control surface implemented through software, such as a tablet computer executing an application that presents an image of control surface 180 through which a user can interact using a touch sensitive display. In any of these situations, control surface 180 may be implemented as or within an external device that is connected to workstation 110 or target device 170, such as through a USB cable.

The precise function of each control on control surface 180 may be determined by the model with which control surface 180 is communicating. For example, the controls on a control surface 180 may be used, for example, to: (1) alter values of variables or signals, (2) alter properties of system objects, (3) alter properties of graphic user interface handles, (4) alter parameters of graphical blocks, and/or (5) trigger events in state charts or flow diagrams. For simplicity, in the description that follows, the controls of a control surface 180 will generally be described as controlling parameters of a model, where the term "parameter" may refer to, for example, any of the five items, mentioned in the previous sentence that may be controlled by control surface 180, or other aspects relating to the control or monitoring of a model. Additionally, the term "model" may refer to any graphical block model, textual model, state chart, and/or flow diagram that may be created with TCE 120.

One example of a commercially available MIDI control surface includes a device that is smaller than a keyboard, has 36 input elements (e.g., nine knobs nine sliders, and 18 push buttons), and connects to a host and is powered through a Universal Serial Bus (USB) interface.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more other tasks described as being performed by one or more other components of system 100.

Figure 2:
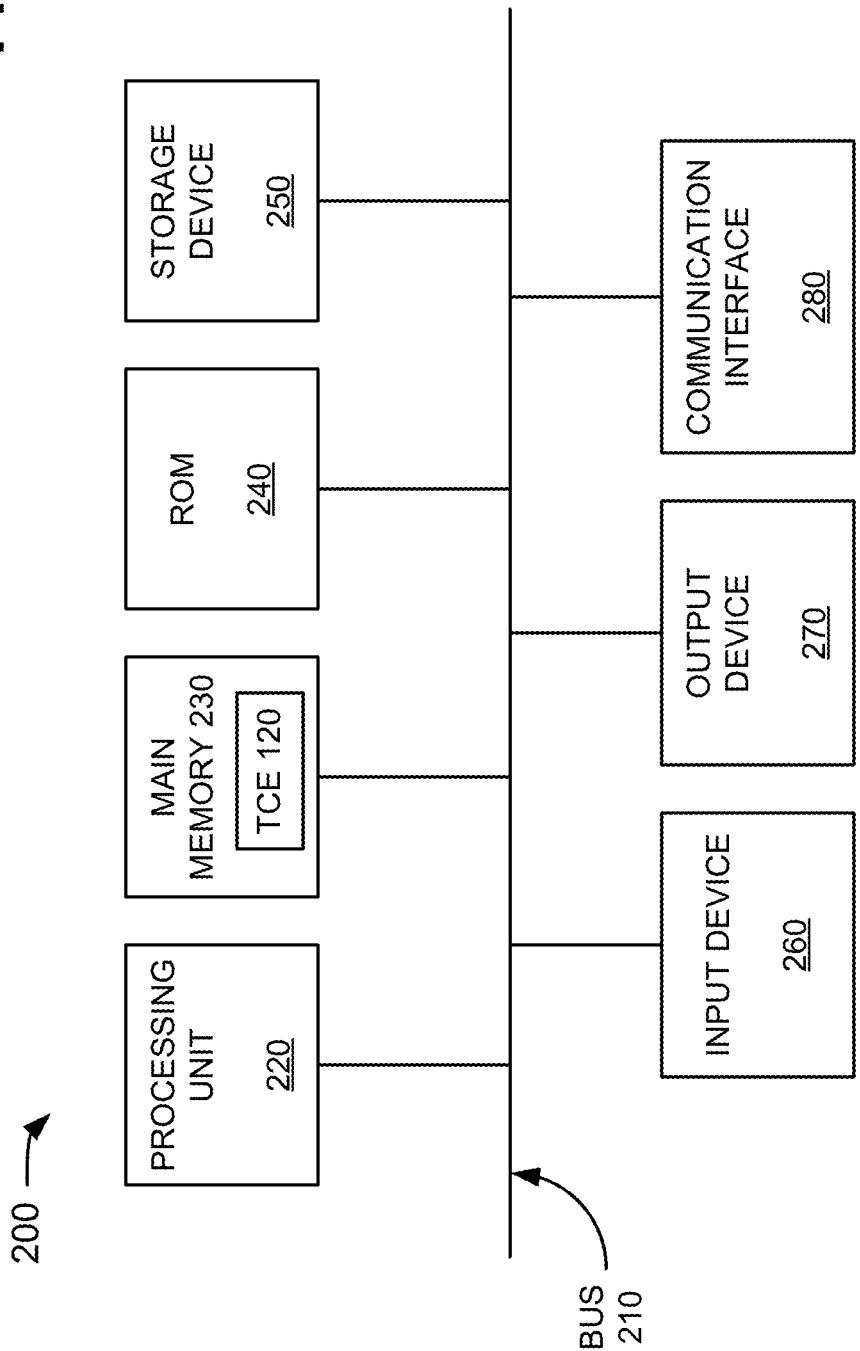
FIG. 2 is a diagram of an example device that may correspond to a workstation.

FIG. 2 is a diagram of an example device 200 that may correspond to workstation 110, target device 170, or a remote device running remote TCE 140 or TCE service 160. In one example, workstation 110, target device 170, and/or the remote device may include one or more devices 200 and/or components of device 200. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, multiple processors, microprocessors, or other types of processing logic that may interpret and execute instructions. Main memory 230 may include a random access memory (RAM) or another type of dynamic storage device that may store information and instructions for execution by processing unit 220 (e.g., instructions implementing TCE 120). ROM 240 may include a ROM device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to device 200, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a printer, a speaker, etc. In the case of a display, the display may be a touch screen display that acts as both an input and an output device. Input device 260 and/or output device 270 may be haptic type devices, such as joysticks or other devices based on touch.

Communication interface 280 may include any transceiver-like mechanism that enables device 200 to communicate with other devices and/or systems. For example, communication interface 280 may include mechanisms for communicating with another device or system via a network.

As will be described in detail below, device 200 may perform certain operations in response to processing unit 220 executing software instructions contained in a computer-readable medium, such as main memory 230. For instance, device 200 may implement TCE 120 by executing software instructions from main memory 230. A computer-readable medium may be defined as a non-transitory memory device, where the memory device may include a number of physically, possible distributed, memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Control Surfaces for TCE Created Models

Figure 3:
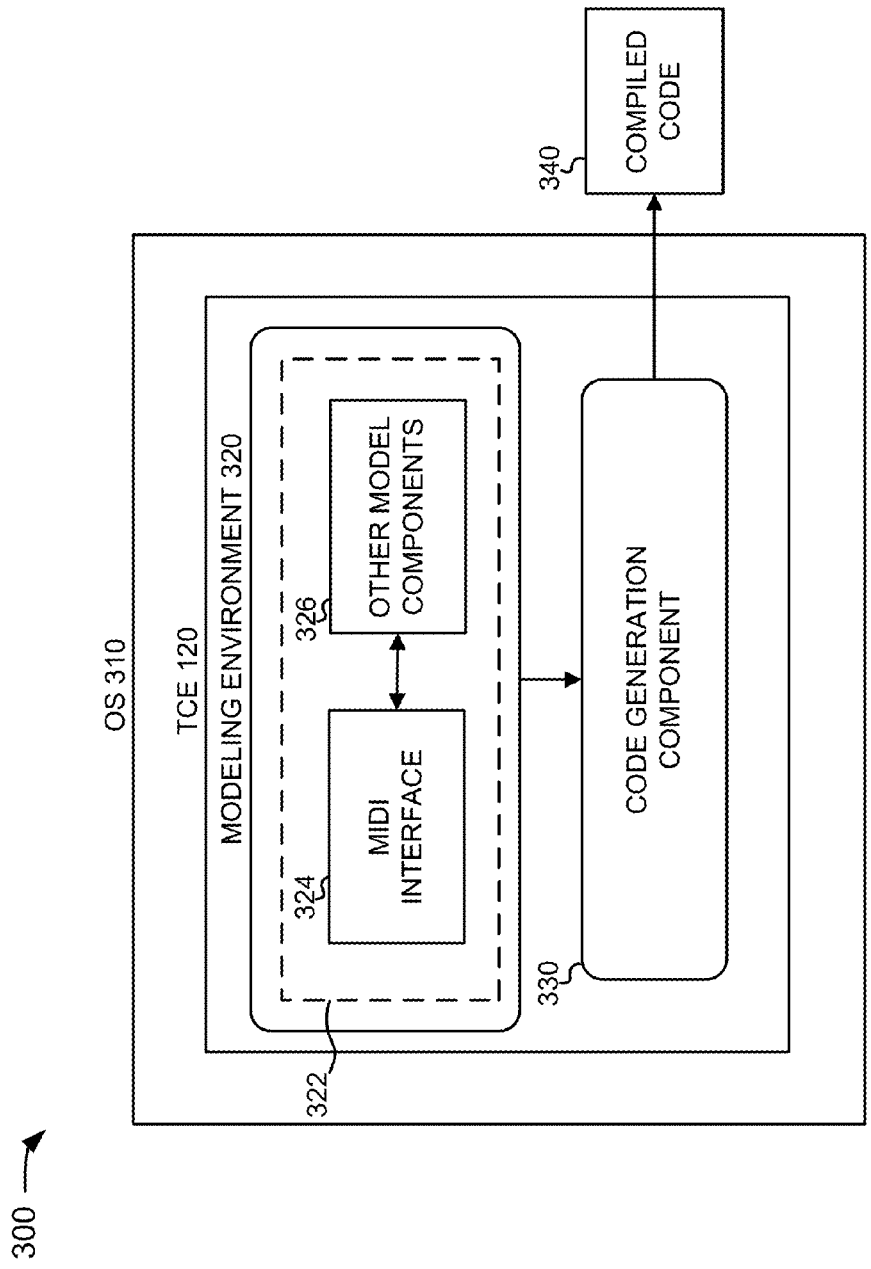
FIG. 3 is a diagram illustrating example functional components that relate to the use of control surfaces, as human interface devices, for models.

FIG. 3 is a diagram illustrating example functional components 300 that relate to the use of control surfaces, as human interface devices, for models created with TCE 120. The functions described in connection with FIG. 3 may be performed by one or more components of device 200 (e.g., workstation 110) or by one or more devices 200.

As shown in FIG. 3, functional components 300 may include an operating system (OS) 310, which may include a set of programs that manage the computer hardware resources of workstation 110 and may provide common services for application software, such as TCE 120. TCE 120 may include a modeling environment 320 and a code generation component 330.

Modeling environment 320 may include logic to allow users of TCE 120 to create models. The created models may include models of systems, such as models of a physical system, a computing system, an engineered system, an embedded system, a biological system, a chemical system, an algorithm, a state-based model, an event-based model, a time-based model, a dataflow model, etc. Modeling environment 320 may enable the creation of models using graphical or text-based interfaces. For example, in one implementation, modeling environment 320 may provide graphical blocks, each representing functionality, and each potentially including one or more inputs and one or more outputs. The graphical blocks may be arranged, by a user of TCE 120, in a configuration to implement the desired model, labeled as model 322 in FIG. 3. In an alternative possible implementation, modeling environment 320 may provide a text-based interface through which a user can create a model, such as by writing functions and/or using one or more functions provided by modeling environment 320.

Modeling environment 320 may particularly include a MIDI interface component 324. MIDI interface component 324 may represent, for example, a graphical block (and its associated functionality) and/or textual functions (e.g., a textual system object) that can be included as components of model 322. MIDI interface component 324 may implement all or a portion of the MIDI protocol. By including MIDI interface component 324 in model 322, model 322 can communicate with control surfaces 180. For example, workstation 110 or target device 170 may receive signals from control surface 180. The signals may be used to control parameters of model 322. Control surface 180 may be a standard, off-the-shelf MIDI device. Thus, by including MIDI interface component 324 in a model, a user can easily and efficiently provide an input mechanism to the model through which a number of parameters, of the model, may be controlled.

In one implementation, modeling environment 320 may facilitate creating models using a number of possible programming languages, such as MATLAB code, MATLAB-compatible code, Simulink code, Simulink-compatible code, Stateflow code, Stateflow-compatible code, SimEvents code, SimEvents-compatible code, LabView code, LabView-compatible code, MATRIXx code, MATRIXx-compatible code, python code, or python-compatible code; etc. These programming languages may include both dynamically-typed and statically-typed languages.

In operation, MIDI interface component 324 may generally operate to communicate with control surfaces 180 using the MIDI protocol (or a subset of the MIDI protocol). For instance, control surfaces 180 may transmit a MIDI "control change" message when a control is moved. Each control change message may identify the control that is changing and may include a new value for the control. MIDI interface component 324 may listen for the control change messages and may output a value, to other model components 326 (e.g., to one or more of other model components 326 that are connected to MIDI interface component 324), that reflects the new value that is received as part of the control change message. In one implementation, MIDI interface component 324 may output a value in the range of zero to one, based on the control change message received from the MIDI control surface 180.

In some alternative implementations, instead of implementing the MIDI protocol, other communication protocols may be used, such as other communication protocols compatible with or similar to the MIDI protocol. One such similar protocol that may be used includes the Open Sound Control (OCS) protocol. Further, as mentioned, in some implementations, MIDI interface component 324 may implement a subset of the MIDI protocol. For instance, messages not needed to communicate a state of the controls of control surface 180, such as the MIDI "note on" and "note off" messages may not be implemented by MIDI interface component 324.

Other model components 326 may represent the portion of a model not including MIDI interface component 324. Other model components 326 may include, for example, one or more graphical blocks, textual functions (e.g., code), or other objects that are used to implement model 322. Other model components 326 may receive signals, such as signals from control surface 180, via MIDI interface component 324. The signals may be used to control parameters of model 322.

In some implementations, control surface 180, in addition to transmitting signals to MIDI interface component 324, may be able to receive signals from MIDI interface component 324. For example, control surface 180 may include a knob that is controlled by motors. In this situation, other model components 326 may transmit values, using MIDI interface component 324, to control surface 180, to actuate the knob.

Code generation component 330 may include logic to generate programming code, such as compiled code 340, for a particular target device 170. Code generation component 330 may, based on model 322 or based on code representing model 322, convert model 322 into a form capable of being executed in the particular target device 170. The target device 170 may include, for example, workstation 110 or an external target device 170, such as an embedded processor and/or system.

In one implementation, a user of TCE 120 may select a particular target device 170 from, for example, a menu. Code generation component 330 may then convert model 322 into a format that can be executed on the particular target device 170. In this manner, model 322, which may be created using modeling environment 320, can be converted to a form that is capable of being executed on one of a number of possible target devices. Compiled code 340 may generally represent any representation of model 322 that is converted to be executed at a particular target device 170. Compiled code 340 may be, for example, machine-level code, source code, a mix of machine-level code and source code, etc.

Although FIG. 3 shows example functional components 300 of workstation 110, in other implementations, workstation 110 may contain fewer functional components, different functional components, differently arranged functional components, or additional functional components than depicted in FIG. 3. Alternatively, or additionally, one or more functional components 300 of workstation 110 may perform one or more tasks described as being performed by one or more other functional components of workstation 110.

Figure 4A:
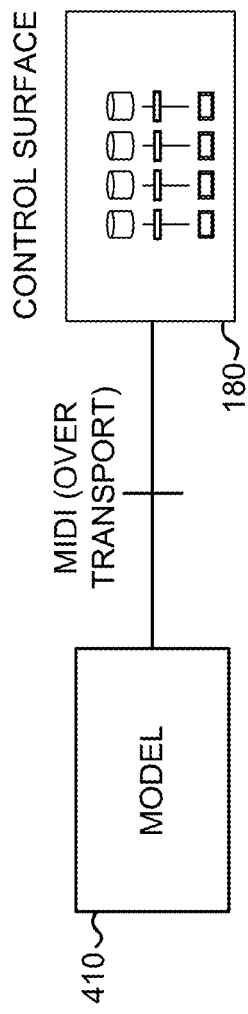
FIGS. 4A and 4B are diagrams illustrating an example of communication with models using control surfaces.
Figure 4B:
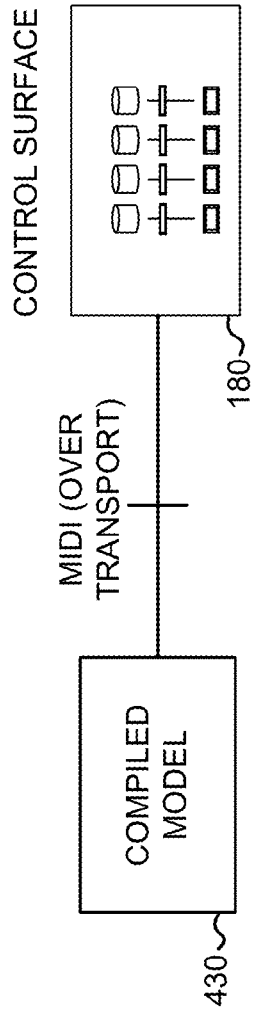

FIGS. 4A and 4B are diagrams illustrating an example of communication with models with control surfaces. As shown in FIG. 4A, a model 410 may communicate with control surface 180. In this example, assume that model 410 is a model that is being executed by TCE 120. For example, TCE 120 may include an "execute" or "debug" mode in which models may be executed and receive real or simulated input signals.

Model 410 and control surface 180 may be connected together using a number of possible transport technologies, such as USB, Ethernet, FireWire, MIDI cable, etc. Signals resulting from the user's interaction with control surface 180 may be transmitted, using the MIDI protocol implemented over a transport technology, to model 410. Model 410 may adjust, based on the signals, one or more parameters of model 410.

In FIG. 4B, a model 430 is illustrated as communicating with control surface 180. In this example, assume that model 430 is a model that is compiled, such as by code generation component 330, and then executed by a target device 170. For example, code generation component 330 may generate compiled code 340, which may be downloaded to target device 170 and executed as model 430. As with model 410, signals corresponding to the user's interaction with control surface 180 may be transmitted, using the MIDI protocol and over a transport technology such as USB, to model 430. Embodiments, such as those illustrated in FIG. 4B, may allow a user to control modeling code running on target device 170.

Figure 5:
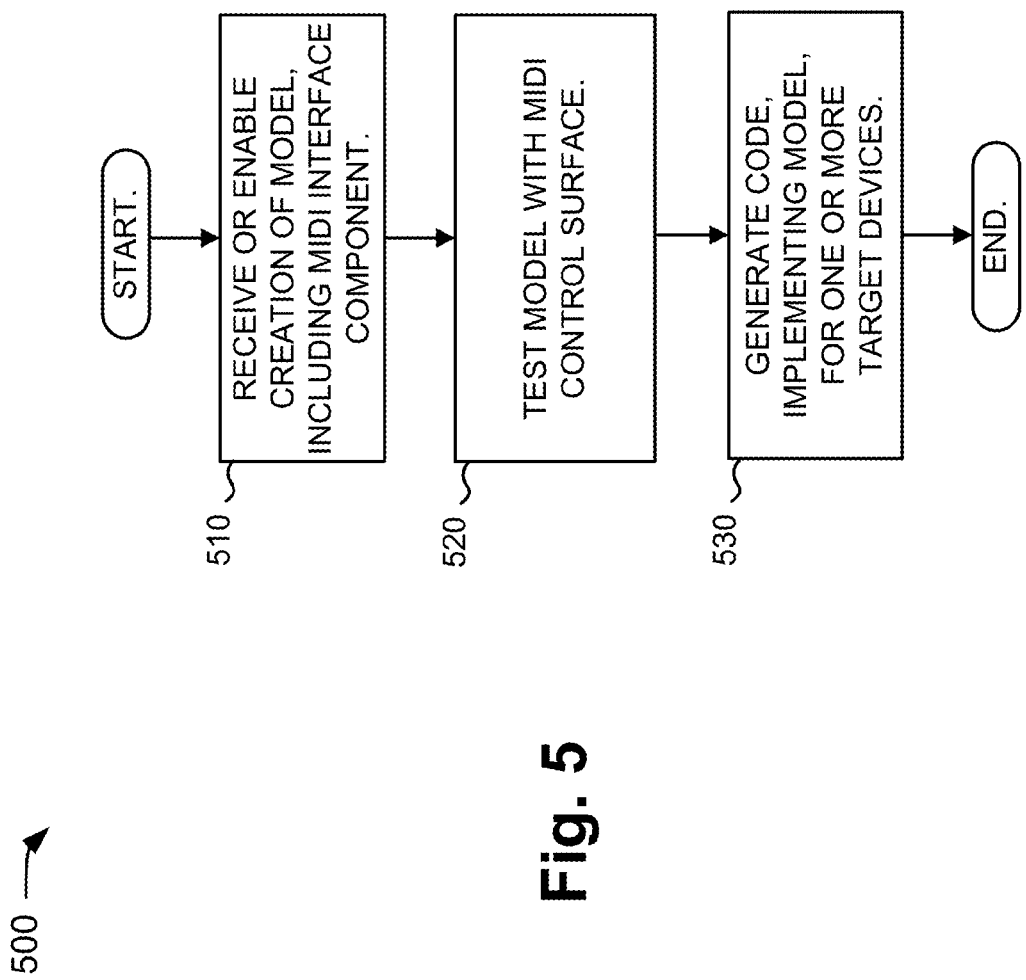
FIG. 5 is a flow chart illustrating an example process for generating a model that uses a Musical Instrument Digital Interface (MIDI) control surface.

FIG. 5 is a flow chart illustrating an example process 500 for generating a model, or code that represents a model, that uses a MIDI control surface. Process 500 may be performed by, for example, workstation 110 executing TCE 120.

Process 500 may include receiving a model or otherwise enabling or facilitating the creation of a model (block 510). The model may include MIDI interface component 324 (block 510). For example, as previously discussed, modeling environment 320 may provide a graphical or textual interface through which a user may create a model designed to obtain one or more values from a MIDI human interface device (e.g., control surface 180). The interface for the MIDI human interface device may be incorporated into the model as MIDI interface component 324.

In one implementation, TCE 120 may provide the user with one or more utilities to assist the user in mapping physical controls on control surface 180 to corresponding inputs at MIDI interface component 324. For example, TCE 120 may provide a utility function that prompts the user to move a desired control on control surface 180. Based on MIDI control change messages that are received in response to the movement of the control on control surface 180, MIDI interface component 324 may associate the control with an input variable for MIDI interface component 324. The user may use the utility function multiple times to identify multiple physical controls on control surface 180.

Process 500 may further include testing the model, including testing of the MIDI interface (block 520). For example, the model may be executed by TCE 120 and values for parameters in the model may be observed, by the user, as the user adjusts buttons, knobs, or other physical input mechanisms, on control surface 180. In response, the user may, for example, interactively, through TCE 120, modify the operation of the model.

At some point, the user may determine that the model is ready for deployment in a target device. At this point, process 500 may further include generating code, to implement the model, on one or more target devices (block 530). For example, the user may control code generation component 330 to generate compiled code for the target device or devices.

A MIDI control surface 180 was generally described above as a control surface that can be used to input values to a model. Some MIDI control surfaces may be capable of receiving values. For such a MIDI control surface, controls, such as sliders, may be motorized so that the control surface can adjust the position of the slider without user interaction. In this situation, MIDI interface component 320 may be bi-directional, which, in addition to receiving control change messages from control surface 180, may transmit control change messages to control surface 180.

FIG. 6 is a diagram illustrating an example of bi-directional communications between a model or compiled model 610 and a control surface 180. Model/compiled model 610 may include a MIDI interface component, such as MIDI interface component 324. Control surface 180 may include a MIDI control surface that includes motors or other actuators capable of moving the physical controls of control surface 180. Alternatively or additionally, instead of physically actuating a control, control surface 180 may include virtual physical controls, such as a knob or slider that is associated with a ring or line of visual indicators (e.g., LEDs) that are turned on/off to indicate the position of the know or slider. As another example of a control surface 180, control surface 180 may be a virtual control surface implemented through software, such as a tablet computer executing an application that presents an image of control surface 180 through which a user can interact using a touch sensitive display.

As shown in the example of FIG. 6, model/compiled model 610, when it is first turned on or initialized, may exchange initial parameter values (625) with control surface 180. The initial parameter values may be the parameters of model/compiled model 610 that are initially set in model/compiled model 610 or parameters values that were saved from a prior execution of the model. Initial parameter values 625 may be passed to control surface 180 using one or more MIDI control change messages that include the intended initial values of the parameters. In response to reception of the MIDI control change messages, control surface 180 may adjust its controls, such as by controlling motors or other physical actuators, to match the received parameter values.

At some point after initialization, a user may adjust the controls of control surface 180. In response, control surface 180 may transmit MIDI control change messages to model/compiled model 610 (user modified values 630), which may update the parameter values for model/compiled model 610.

FIG. 7 is a diagram illustrating an example of unidirectional communications between model/compiled model 610 and control surface 180. Model/compiled model 610 may include a MIDI interface component, such as MIDI interface component 324. Control surface 180 may include a MIDI control surface that includes one or more physical controls but does not include motors or other actuators that could potentially adjust the position of the controls of control surface 180.

When model/compiled model 610 and control surface 180 first communicate with one another, control surface 180 may transmit one or more MIDI control change messages, to model/compiled model 610, that communicate initial parameter values (755) corresponding to the physical controls of control surface 180. In some situations, the values received as initial parameter values 755 may be significantly different than the initial parameter values stored by model/compiled model 610. In order to avoid discontinuities that may adversely affect the operation of model/compiled model 610, model/compiled model 610 may include a limiting component 760 to limit or otherwise modify initial parameter values 755. For example, limiting component 760 may restrict the initial values of parameters of model/compiled model 610 to within a particular range or may restrict the initial change of a parameter value of model/compiled model 610 to within a particular range.

At some point after initialization, a user may adjust, using control surface 180, the controls of control surface 180. In response, control surface 180 may transmit MIDI control change messages to model/compiled model 610 (user modified values 765), which may update the parameter values for the model. In some implementations, model/compiled model 610 may also include, such as through a graphical interface that simulates control surface 180, the ability for a user to adjust parameter values for the model. In this case, changes made by a user, either through control surface 180 or through model/compiled model 610, may be synchronized with respect to both control surface 180 and model/compiled model 610. Thus, changes made to control surface 180 may be reflected in the graphical interface of model/compiled model 610, and changes made to parameters through the graphical interface of model/compiled model 610 may be reflected in control surface 180.

In one implementation, a MIDI control surface may be hot-pluggable with respect to workstation 110 and/or target device 170. In other words, the MIDI control surface may be removed or inserted into workstation 110 and/or target device 170 during operation of the model.

Figure 8:
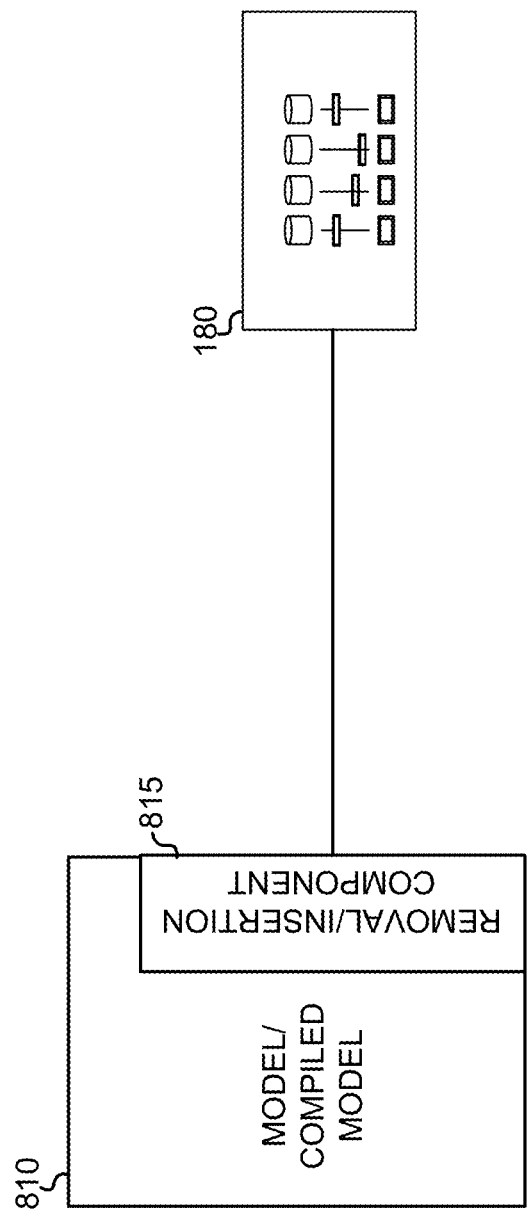
FIG. 8 is a diagram illustrating example components relating to hot-pluggable operation of a model/compiled model.

FIG. 8 is a diagram illustrating example components relating to hot-pluggable operation of a model/compiled model 810. A control surface 180 may include a MIDI control surface that includes one or more physical controls. Further, model/compiled model 810 may include a removal/insertion component 815, which may generally operate to ensure uninterrupted operation of model/compiled model 810 during an insertion or removal of control surface 180. For hot-pluggable operation of model/compiled model 810, the transport technology between model/compiled model 810 and control surface 180 may be a transport technology, such as USB, that supports hot-pluggable operation.

Removal/insertion component 815 may operate to detect the removal or insertion of control surface 180. For example, in one implementation, removal/insertion component 815 may poll operating system 310 to determine when a USB device, corresponding to control surface 180, is removed or inserted. In response to the removal of control surface 180 during operation of model/compiled model 810, removal/insertion component 815 may hold the parameter values that are received from control surface 180 at a steady value, such as the last received parameter value. Alternatively, removal/insertion component 815 may perform other functions in response to detection of removal of control surface 180, such as informing other elements of model/compiled model 810 (e.g., other blocks) that control surface 180 has been removed.

In response to the insertion of control surface 180 during operation of model/compiled model 810, removal/insertion component 815 may perform an initialization procedure relating to the parameters of model/compiled model 810. The initialization procedure may include the communication of initial parameter values 625 or 755, as discussed previously with reference to FIGS. 6 and 7.

FIG. 9 is a diagram illustrating example graphical interfaces presented by a model. In some implementations, a model, such as model 322, may execute in an environment in which a display is used to present a graphical interface to a user. The graphical interface may include one or more windows.

In FIG. 9, a graphical interface 900 is illustrated as including two windows 910 and 920. Each window 910 and 920 may, for example, present information to a user and/or receive inputs from the user. As particularly shown, two sets of virtual slider controls, 912 and 914, are illustrated in windows 910 and 920, respectively. During the operation of model 322, a user may adjust slider controls in a set of virtual slider controls 912/914 by, for example, using a mouse or other pointing device. Alternatively, as shown in FIG. 9, a control surface 180 may, which includes sets of physical slider controls 930 and 932, may also be used during the operation of model 322. In this example, assume that the sets of slider controls 912/914 and 930/932 are linked so that changes made to a physical slider, in the set of physical slider controls 930/932, will result in model 322 correspondingly adjusting the virtual slider in the set of virtual slider controls 912/914.

As is further shown in FIG. 9, OS 310 and a sharing component 940 may act as logical interfaces between graphical interface 900 and control surface 180. OS 310 may, for example, handle the low level connection to control surface 180. Sharing component 940 may provide an interface through which multiple windows, such as windows 910 and 920, may communicate with a single control surface 180.

In one implementation, when a first one of windows 910 or 920 attempts to connect to control surface 180, sharing component 940 may open a connection, through OS 310, to control surface 180. When a second one of windows 910 or 920 attempts to connect to control surface 180, sharing component 940 may share the previously open connection to control surface 180. Sharing component 940 may, for instance, forward MIDI control change messages from one of physical sliders, in the set of physical slider controls 930/932, to the window 910 or 920, to which the physical slider is assigned.

FIG. 9 illustrates the sharing of different sets of physical slider controls 930/932, on a single control surface 180, by virtual controls in two windows 910 and 920. In an alternative implementation, a single physical slider or set of physical sliders may be shared by two or more windows. In this case, changes made to the physical slider may be reflected in the windows and changes made in any of the windows may be reflected the physical slider (and potentially in the other one (s) of the windows). Additionally, in some implementations, virtual controls that correspond to a single physical control may be presented in the same window, separate windows of a single model, separate models that are being simultaneously executed by a single TCE 120, or in models that are being simultaneously executed by multiple instances of TCE 120.

In the MIDI protocol, values in MIDI control change messages may be represented as a seven-bit value, providing for integer control values in the closed interval [0, 127]. MIDI interface component 324 may convert these integer control values into a range of real numbers, such as [0, 1] or [−1, 1]. A direct method to convert an integer interval to a range of real values may include dividing the received integer value by the maximum possible value (to obtain the range [0, 1]) and then shifting and/or scaling to obtain the desired real number range. For example, [0, 127] may be converted to the real range [0, 1] as:

$$x/127;$$

where x represents the received integer value. The real range [−1, 1] may be obtained as:

$$x/127*2-1.$$

Because the integer interval [0, 127] includes an even number of possible values, the midpoint of the two real ranges (0.5 and 0) is not obtainable using these two conversion formulas. This can be particularly problematic for a range such as [−1, 1], where a user may expect to be able to set a control to zero to obtain the midpoint.

In one implementation, an integer range, having an even number of values, may be converted to a real range by subtracting 1 from the received integer value, when the received integer value is greater than the midpoint, and then dividing by one less than the maximum value of the integer range. For example, the conversion for the real range [−1, 1], from the integer range [0, 127], may be obtained as:

$$(x-1)/126*2-1; \text{ when } x>63$$

$$x/126*2-1; \text{ otherwise}.$$

With this formula, both x=63 and x=64 are converted to zero. This may be desirable, as it makes it easier for a human to adjust a control to produce exactly zero.

Although the above description of MIDI interface component 324 was described with reference to inputs received from a physical control surface, in some implementations, such as when testing a model, a user may desire to emulate a control surface as a software application (virtual) control surface that includes graphical sliders, knobs, or other control elements. In one implementation, MIDI interface component 324 may include an option to allow MIDI interface component 324 to communicate with virtual control surfaces.

CONCLUSION

A TCE that includes mechanisms for communicating with a control surface, such as a MIDI control surface, was described herein. The control surface may be a hot-pluggable control surface that contains one or more knobs, slider buttons, or other buttons that can be used to provide a natural and intuitive interface to controlling parameters for a model designed with the TCE.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

Also, the term "user" has been used herein. The term "user" is intended to be broadly interpreted to include, for example, a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An apparatus comprising:
a memory to store instructions; and
a processor to execute the instructions to:
  receive one or more input signals through an interface device using a Musical Instrument Digital Interface (MIDI) compatible protocol;
  receive one or more parameters, corresponding to the one or more input signals received using the interface device;
  operate on the one or more parameters;

receive a MIDI control message that includes information associated with an adjustment of the interface device;
generate, from a model and based on receiving the MIDI control message, programming code compatible with a target environment; and
output the programming code.

2. The apparatus of claim 1, where the processor is further to:
provide, for presentation, a graphical model or a textual model.

3. The apparatus of claim 1, where the processor is further to:
provide, for presentation, at least one of:
a state-based model,
an event-based model,
a time-based model, or
a dataflow model.

4. The apparatus of claim 1, where the target environment includes at least one of:
a general computing device,
a graphics processing unit,
a field programmable gate array, or
an application specific integrated circuit.

5. The apparatus of claim 1, where the processor is further to:
implement a subset of the MIDI compatible protocol.

6. The apparatus of claim 1, where the processor is further to:
transmit signals, to the interface device, using the MIDI compatible protocol.

7. The apparatus of claim 1, where the processor is further to:
transmit signals to the interface device during an initialization procedure to synchronize controls on the interface device with parameter values used by the model.

8. The apparatus of claim 7, where the processor supports a hot-plugging MIDI compatible device.

9. The apparatus of claim 1, where the processor is further to:
limit a change between a value of a parameter that is initially received, as part of the one or more input signals, and a corresponding value for the parameter, as stored by the model.

10. The apparatus of claim 1, where the processor is used to support modeling of a biological system.

11. The apparatus of claim 1, where the processor is used to support distributed computing or distributed modeling.

12. The apparatus of claim 1, where the processor is further to:
receive parameter values including integers,
where there are an even number of possible integers; and
scale and shift a received integer value into a real value, based on the received integer value, with respect to a midpoint of a range of integer values, such that multiple different integer values are converted to a midpoint of a possible range of real values.

13. The apparatus of claim 1, where the model is written in at least one of:
MATLAB code,
MATLAB-compatible code,
Simulink code,
Simulink-compatible code,
Stateflow code,
Stateflow-compatible code,
SimEvents code,
SimEvents-compatible code,
LabView code,
LabView-compatible code,
MATRIXx code,
MATRIXx-compatible code,
python code, or
python-compatible code.

14. The apparatus of claim 1, where the model is written in a text-based modeling language or a graphical-based modeling language.

15. The apparatus of claim 1, where the model is written in a dynamically typed programming language.

16. The apparatus of claim 1, where the interface device is an externally connected human interface device.

17. The apparatus of claim 16, where the externally connected human interface device includes an externally connected tablet computer with a touch sensitive display.

18. A method comprising:
receiving a first portion of a model of a design,
the first portion including logic to:
implement, during operation of the model, a Musical Instrument Digital Interface (MIDI) compatible protocol or an Open Sound Control (OCS) compatible protocol, through which the model receives one or more input signals from an interface device, and
the receiving the first portion being performed by a computing device;
receiving a second portion of the model of the design,
the second portion including logic to:
receive values from the first portion,
operate on the received values, and
provide one or more output signals, and
the receiving the second portion being performed by the computing device;
receiving a control message that includes information associated with an adjustment of the interface device,
the receiving the control message being performed by the computing device;
generating, based on receiving the control message, programming code, compatible with a target environment, to implement the model,
the generating being performed by the computing device; and
outputting the programming code,
the outputting being performed by the computing device.

19. The method of claim 18, where the target environment includes a general computing device.

20. The method of claim 18, where the first portion of the model implements a subset of the MIDI compatible protocol or the OCS compatible protocol.

21. The method of claim 18, further comprising:
transmitting, during operation of the model, signals, to a compatible device, using the MIDI compatible protocol or the OCS compatible protocol.

22. The method of claim 21, further comprising:
transmitting initialization signals to the compatible device, during an initialization procedure, to synchronize controls on the compatible device with parameters used by the model.

23. The method of claim 21, further comprising:
providing, for presentation, a graphical interface that includes graphical controls to modify parameters used by the model,
where changes to the graphical controls and changes to the controls on the compatible device are synchronized.

24. The method of claim 18, further comprising:
providing an interface to enable interaction of a plurality of entities with a single control surface.

25. The method of claim 24, where the plurality of entities interact with a single control on the single control surface.

26. The method of claim 24, where
the plurality of entities include:
a first plurality of separate graphical windows associated with the model, and
a second plurality of separate graphical windows associated with the model and with one or more additional models, and
the model and the one or more additional models are executed by a single technical computing environment or by separate technical computing environments.

27. The method of claim 18, further comprising:
limiting a change between a value of a parameter that is initially received, as part of the one or more input signals, and a corresponding value for the parameter, as stored by the model.

28. The method of claim 18, where receiving the first portion of the model and receiving the second portion of the model are performed using a graphical modeling environment.

29. The method of claim 28, where the graphical modeling environment presents a state flow model or a graphical block modeling environment.

30. The method of claim 18, where the interface device includes a human interface device that is connected externally relative to the computing device.

31. The method of claim 18, where the interface device includes a software application that is being executed by the computing device.

32. The method of claim 31, where the interface device includes at least one of:
graphical sliders,
knobs, or
other control elements.

33. A non-transitory computer-readable medium storing instructions, the instructions comprising:
one or more instructions which, when executed by a processor, cause the processor to:
receive one or more input signals through an interface device using a Musical Instrument Digital Interface (MIDI) compatible protocol or a protocol similar to the MIDI protocol;
receive one or more parameters, corresponding to the one or more input signals received using the interface device;
operate on the one or more parameters;
receive a control message that includes information associated with an adjustment of the interface device;
generate, from a model and based on receiving the control message, programming code compatible with a target environment; and
output the programming code.

34. The non-transitory computer-readable medium of claim 33, where the instructions further include:
one or more instructions to provide, for presentation, a graphical model or a textual model.

35. The non-transitory computer-readable medium of claim 33, where the instructions further include:
one or more instructions to provide, for presentation, at least one of:
a state-based model,
an event-based model,
a time-based model, or
a dataflow model.

36. The non-transitory computer-readable medium of claim 33, where the target environment includes at least one of:
a general computing device,
a graphics processing unit,
a field programmable gate array, or
an application specific integrated circuit.

37. The non-transitory computer-readable medium of claim 33, where the instructions further include:
one or more instructions to implement a subset of the MIDI compatible protocol or the protocol similar to the MIDI protocol.

38. The non-transitory computer-readable medium of claim 33, where the instructions further include:
one or more instructions to transmit signals, to the interface device, using the MIDI compatible protocol or the protocol similar to the MIDI protocol.

39. The non-transitory computer-readable medium of claim 33, where the instructions further include:
one or more instructions to transmit signals to the interface device during an initialization procedure to synchronize controls on the interface device with parameter values used by the model.

40. The non-transitory computer-readable medium of claim 33, where the instructions further include:
one or more instructions to limit a change between a value of a parameter that is initially received, as part of the one or more input signals, and a corresponding value for the parameter, as stored by the model.

41. The non-transitory computer-readable medium of claim 33, where the model is written in at least one of:
a text-based modeling language,
a graphical-based modeling language, or
a dynamically typed programming language.

\* \* \* \* \*